June 30, 1964   G. A. TINNERMAN   3,139,261
MOUNTING CLIPS OR CLAMPS
Original Filed Jan. 27, 1960   3 Sheets-Sheet 1

INVENTOR
GEORGE A. TINNERMAN
BY: Featherstonhaugh & Co
ATTORNEYS

June 30, 1964 G. A. TINNERMAN 3,139,261
MOUNTING CLIPS OR CLAMPS
Original Filed Jan. 27, 1960 3 Sheets-Sheet 2

INVENTOR
GEORGE A. TINNERMAN
BY Fetherstonhaugh & Co
ATTORNEYS

June 30, 1964   G. A. TINNERMAN   3,139,261
MOUNTING CLIPS OR CLAMPS
Original Filed Jan. 27, 1960   3 Sheets-Sheet 3

INVENTOR
GEORGE A. TINNERMAN
BY: Featherstonhaugh & Co
ATTORNEYS

United States Patent Office
3,139,261
Patented June 30, 1964

3,139,261
MOUNTING CLIPS OR CLAMPS
George A. Tinnerman, 23012 Lake Road,
Bay Village, Ohio
Original application Jan. 27, 1960, Ser. No. 5,073, now Patent No. 3,066,903, dated Dec. 4, 1962. Divided and this application Feb. 5, 1962, Ser. No. 170,975
3 Claims. (Cl. 248—361)

This invention relates to mounting clips or clamps and is a divisional of application Serial No. 5,073, filed January 27, 1960, now Patent No. 3,066,903, granted December 4, 1962.

Mounted clips have been employed in various fields embodying pairs of metal elements having an anchoring means on one end and lugs on the other, usually connected together by means of a nut and bolt, the tightening of which applies the necessary tension for holding the object which is to be mounted or secured. Such clips are sometimes cumbersome to work with and require time to secure since it is necessary to thread the bolt through the orificed lugs and then apply a nut which has to be tightened to obtain the required tension. Moreover, in this respect, it is obvious that they require extra elements besides the clip, i.e. nut and bolt, to effect securement, whereas it is obvious also that time is often lost in positioning the bolt and applying the screw because such parts are often dropped during the operation and are sometimes misplaced.

The present invention provides a clip which obviates these disadvantages of this prior type and provides in one simple element, when used in pairs, a mounting or securing clip which involves two parts only and which is fastened in tension in a very simple operation, one element being reversed in relation to the other to form complementary engageable members.

The invention generally comprises a mounting clip, coupling or the like formed from a single resilient element having anchoring or securing means on one end, and coupling means on the opposite end thereof, and a body lying therebetween and bent adjacent said opposite end to form an offset tension applying shank, the free end of said strip adjacent to the tension applying portion being bent angularly in respect to the first mentioned bend to provide a coupling element having a locking lug offset from the plane thereof to project to one side of the central longitudinal axis of said strip, said clip being usable in pairs with one clip reversed relative to another providing complementary interlockable coupling elements secured together by said offset lugs when said elements are lapped with one another. The strip material may be formed in various ways for strength and may be formed to give it channel-like characteristics for embracing an object to be mounted, portions of which may be disposed within the channel-like formation.

The invention will be clearly understood by reference to the following detailed specification taken in conjunction with the accompanying drawings.

Figure 5:
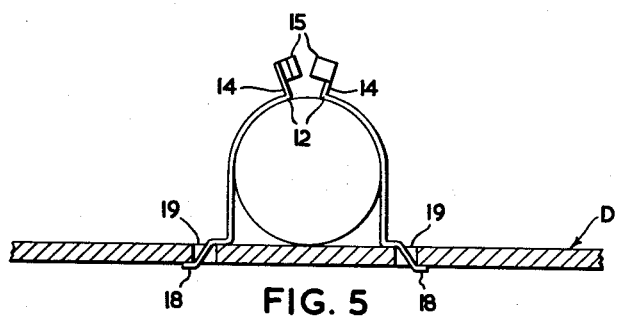
Figures 6, 6A:
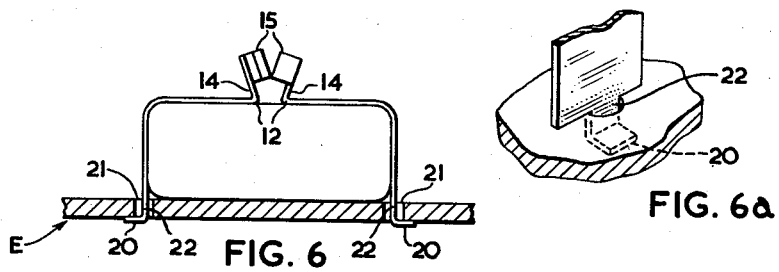
Figures 7, 7A, 8:
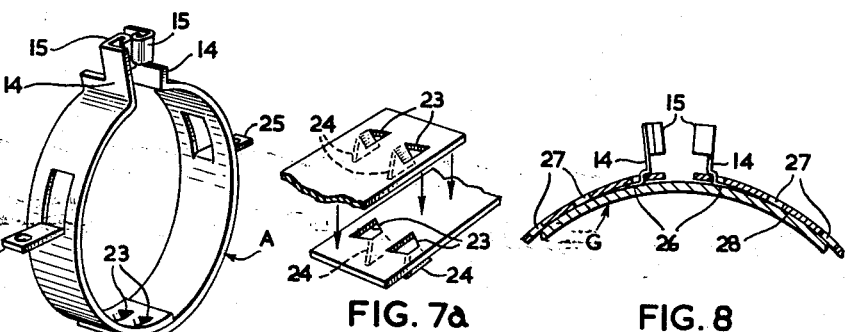
Figure 10:
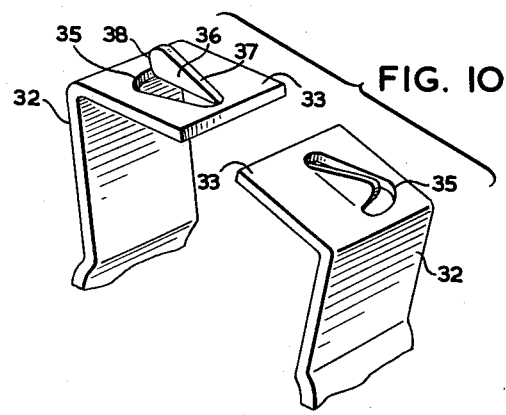
Figure 9:
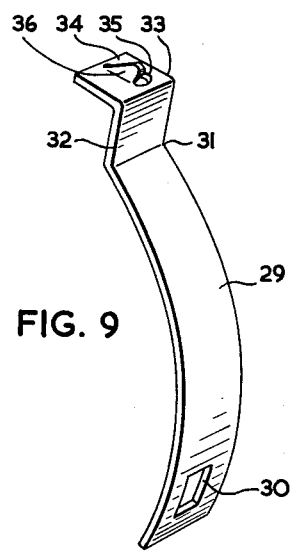
Figure 11:
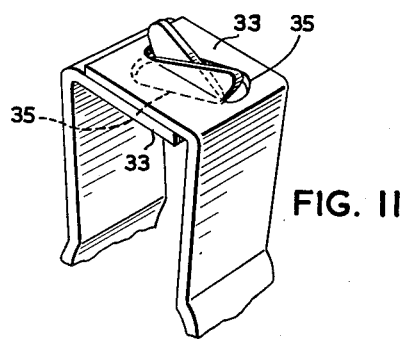

FIGURES 4, 4a, 4b, 4c, 4d, and 4e illustrate in transverse section various formations of the strip which may be employed according to the present invention;

FIGURE 5 is a schematic, partly sectional, view of the mounting by means of clips of a cylindrical object prior to the engagement in tension of the complementary hook-like elements;

FIGURE 6 is a similar view to FIGURE 5 showing the clips in relation to the clamping of an object of somewhat rectilinear cross-section with a varied formation of anchoring means on the opposite ends of the clip;

FIGURE 6A is a perspective detail of the anchoring formation;

FIGURE 7 is a perspective view of a pair of mounting clips according to the present invention illustrating the manner in which they may be connected together to form a unitary composite ring-like member and illustrating also mounting means in the form of tangs struck therefrom;

FIGURE 7A is a fragmentary perspective detail of one manner in which the anchoring ends of the strips may be formed to complement one another in engagement;

FIGURE 8 is an alternative form of construction showing the formation of clips according to the invention which are anchored in the ends of orificed strap metal which may be adapted to encircle an object to be clamped;

FIGURE 9 is a perspective illustration of a further alternative form of clip;

FIGURE 10 is an enlarged fragmentary view of the top ends of a pair of clips such as illustrated in FIGURE 9 arranged in reversed relation for interlocking;

FIGURE 11 is a similar view to FIGURE 10 showing the top ends of the clips interlocked.

Referring to the drawings, A indicates a strip of resilient material, usually spring steel, and which is provided with a form of securing or anchoring means at one ends, such as a slot 10, and at the opposite end is partially slit transversely as at 11, the slit extending from one edge of the strip inwardly to a suitable degree, such as approximately half the width of the strip. This slit or notch, as the case may be, is located between a transverse point of bending 12 of the strip and its end 13 opposite to the anchoring end.

Figure 1:
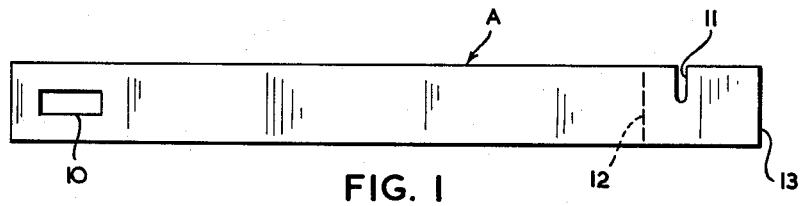
FIGURE 1 illustrates in plane view a blank of strip material from which the clip is formed according to the generally preferred form of invention.
Figure 2:
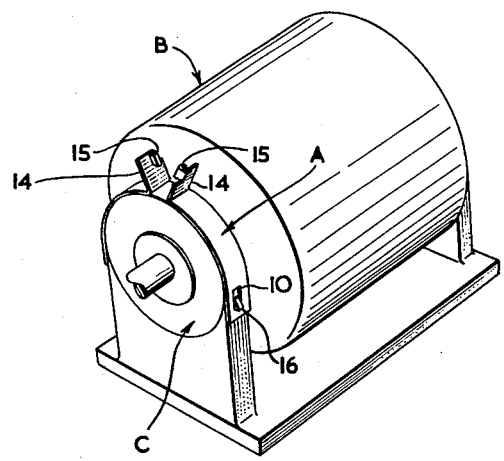
FIGURE 2 is a perspective view of a motor employing a pair of said clips in connection with the resilient mounting of the motor.
Figure 3:
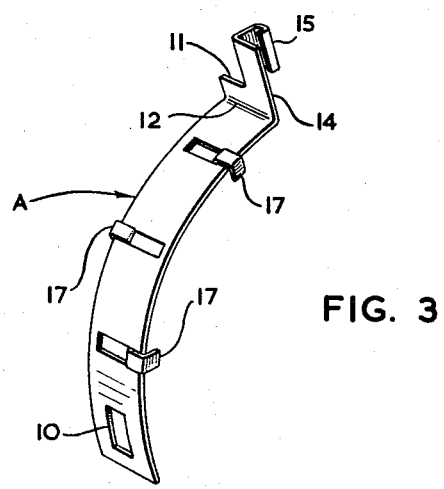
FIGURE 3 is a perspective illustration of a preferred form of clip according to the present invention, which includes as well tangs struck from the strip extending on each side thereof and bent to give substantially channel-like characteristics of the clip.

As shown in FIGURE 3, the strip A is bent along the line 12 to provide the tension applying portion 14 upstanding from the strip and inclined at least slightly rearwardly towards the remainder of the strip, so that it forms with the strip, at the point 12 of bending, an angle slightly less than 90°. The tension applying portion or shank 14 is bent between the slit 11 and the adjacent end of the strip along axes substantially perpendicular to the line 12 of bending, to form a securing element in turn bent to form an offset locking lug or the hook-like portion 15, disposed to one side of the central longitudinal axis of said strip. With this general construction, the utility of one form of the clip is generally illustrated by way of FIGURE 2. It is obvious from the formation of the clip as shown in FIGURE 3 that, when used with an identical clip reversed in relation to one another, the clips become complementary and consequently the locking lugs or hook-like portions 15 thereof will lock with one another when applied in a practical manner.

Referring to FIGURE 2, the motor B, having its bearing mounted in the resilient ring C, is secured in a very simple manner by engaging lugs 16 of the mounting base in the slot 10 of each clip, whereupon by urging the tension applying portions 14 of the clip towards one another by a suitable tool, the hook-like portions 15 thereof are engaged with one another to provide for very firm clamping of the object in question by means of the tension exerted by the tension applying portions 14 of the clips. It should be noted that in the securing operation connecting a pair of these clips, the formation of the clips is such that the shank of one is directly in the path of the hook-like element of the other. Therefore, when the shanks are engaged by pliers or a similar tool as to draw the hooks toward each other for interengagement, the shank of each will function as a stop plate engageable by the hook-like member of the opposite clip so that the shanks cannot be pressed to a point which would cause them to lose their tension applying resiliency.

Where it may be desired to straddle the part being clamped as, for instance, the rubber ring C (FIGURE 2) or other element to be secured in such manner, the present invention embodies striking from the strip the tangs 17, which are bent over the edge on each side of the strip as required, thus to form in effect a channel-like formation by means of the projecting co-operating lugs thus formed.

Figure 4:
Figure 4A:
Figure 4B:
Figure 4C:
Figure 4D:
Figure 4E:

The strip A from which the clip is formed may be given various formations for strengthening purposes, such as is illustrated in FIGURE 4, which includes a plain strip $a$, an outwardly convex strip $b$, a strip having opposed tangs $c$ struck therefrom, an outwardly concave strip $d$, an outwardly channelled strip $e$, and a centrally ribbed strip $g$.

As will be clear from FIGURES 5 and 6, the clips are subject to various formations. In FIGURE 5, the securing or anchoring means for the clips takes the form of the compound bent end 18 designed to extend through an anchoring orifice 19 in a mounting element D. In FIGURE 6 clips are shown adapted for securing an object of generally rectilinear cross-section and wherein the anchoring means is in the form of bent ends 20 to be inserted in receiving orifices 21 of the mounting element E. As shown in FIGURE 6A, the bent anchoring means 20 may take the form of a narrower shank 22 formed on the anchoring end of each clip.

The clip of the present invention embraces formations such as to provide for union of two such clips to form a ring-like clamp. One form of complementary means of uniting the clips together is illustrated in FIGURE 7, and in more detail in FIGURE 7A. In this instance the anchoring or securing ends of the clips are formed by striking from the strip tangs in a manner to form substantially trapezoidal openings 23 and, of course, forming tangs 24 of substantially trapezoidal outline which project substantially at right angles to the plane of the strip and located partially to one side thereof. Consequently, when the clips are reversed one to the other, the tangs 24 of one meet with the longer side of the trapezoidal openings of the other and may be projected therethrough. Consequently, due to the trapezoidal formation of the tangs 24, a firm anchoring of the strip is achieved as against axial pull. Accordingly the composite ring-like clamp formed by the clips may be used in the manner of a pipe clamp or the like, whereas tangs 25 may be struck from each clip to project laterally therefrom to provide a ready mounting means.

In an alternative form of clip illustrated in FIGURE 8, the body of the clip may be smaller and formed with suitable bent lugs or the like 26 such as to enter into an orifice 27 of conventional perforated strap iron 28 as a means of joining the free ends of a strip of strap iron together in a clamping application, such as around a pipe or the like G. Otherwise the clips are of similar formation.

In the alternative form of construction illustrated in FIGURE 9, the clip body 29 is provided with anchoring means such as a slot 30 at one end and at the opposite end it is bent as at 31 to provide the upstanding tension applying portion 32 similar to the construction shown in FIGURES 2 and 3, the adjacent free end thereof being bent as at 33 to provide the angularly disposed coupling element 34. The coupling element 34 is punched or otherwise processed to form an elongated orifice 35 and an outwardly bent locking lug 36. The orifice 35 is defined along one edge thereof by a straight edge parallel to the longitudinal axis of the clip and disposed slightly to one side of this theoretical axis so that the locking lug 36 is, therefore, disposed to one side of, though closely adjacent to, the longitudinal center axis of the clip. Correspondingly, the orifice 35 overlaps and extends beyond the longitudinal axis of the clip and is of tapered shape as to provide in the lug 36 struck therefrom a gradually outwardly sloped edge 37 rising from the terminal end of the lug adjacent the free end of its coupling element to a point of maximum extent rearwardly thereof, as to provide a locking shoulder 38 at the opposite end of the lug. By reason of this formation, the orifice 35 also gradually increases in width from one end thereof to the other as to provide a passage in the securing element 33 of substantial area; whereas the resulting sloped edge 37 on the lug has the function of guiding the coupling element of another cooperating similarly formed clip which is reversed with respect to the other (FIGURES 10 and 11) in such a manner that its lug will ride under the coupling element of the opposite clip and become lodged in the orifice 35 of the opposite clip, as shown in FIGURE 11, and the clips become interlocked under tension when their opposite ends have been anchored in a manner similar to that shown in FIGURE 2 whereby to secure the object to which they are applied. This locking, therefore, is accomplished in a very simple manner. The clips may be unlocked in a very simple manner also by reason of the orifice 35 of the uppermost coupling element 33. This will be apparent from a consideration of FIGURE 11 where it will be noted that a solid portion of the underlying coupling element 33 will underlap the orifice 35 of the uppermost coupling element 33. Consequently, by placing a screwdriver or other tool in orifice 35 of the uppermost coupling element 33 and pressing down against the underlapping solid portion of the underlying coupling element 33, the clips are readily disengaged from locked position. It will be noted that the locking lugs 36 of a pair of clips reversed to one another, as in FIGURES 10 and 11, will usually bear against each other substantially along the center longitudinal axis of the clip, and that the orifice 35 in the underlying coupling element of the joined pair is covered by a solid portion of the uppermost coupling element of the pair. Consequently, by reason of this symmetrical formation which provides complementary opposites when one clip is reversed to the other, it does not matter as to which coupling element is uppermost in the union effected.

It is obvious that the mounting clip provided by the present invention is extremely simple in construction and is adapted to perform a clamping or coupling function which is effected in a particularly simple manner. Moreover, it is also obvious that it is of a character which lends itself to easy manufacture by automation, and that it may be adapted to many clamping or securing uses.

While it is preferred to form the clip from strip-like resilient material, it is obvious that it could be formed from resilient bar stock of somewhat small cross-section, by bending the stock substantially in the manner described in result to provide a tensioning portion and securing elements for coupling purposes. Moreover, while such clip will generally be formed from spring steel, it is obvious that it may be formed from other materials practical to the intended purpose of use. It is therefore intended that the foregoing description should not be interpreted in a sense more limited than the subject matter defined by the appended claims.

What I claim as my invention is:

1. A mounting clip comprising a strip of resilient formable material having securing means on its first end and coupling means on its second end and a body lying therebetween, said strip being bent adjacent said second end to form an offset tension applying shank, a free end of said tension applying shank being bent upon itself angularly in respect to the first mentioned bend to provide along one edge thereof an outwardly projecting securing element forming said coupling means, said clip being usable in pairs with one clip reversed relative to another providing complementary interlapping and interlockable securing elements engageable with one another under tension to clamp an object when said first ends are secured.

2. A mounting clip as claimed in claim 1 wherein said shank is partially slit in a transverse direction, said slit being spaced from said free end and extending inwardly from one edge of said shank, and bent between said slit and said free end along axes substantially perpendicular to the first mentioned bend to form a hook like element outwardly projecting therefrom, thereby forming said coupling means, said clip being usable in pairs with one reversed relative to another to provide complementary interlockable hook like elements being engageable with one another under tension to clamp an object when said first ends are secured to it.

3. A mounting clip as claimed in claim 1 or 2 wherein said tension applying shank forms a stop plate located on said clip relative to its securing element as to be positioned in the path of and engageable by the securing element of the opposite clip of a pair being engaged whereby to avoid bending of said tension applying shank and loss of tension applying resiliency.

References Cited in the file of this patent

UNITED STATES PATENTS

| | | |
|---|---|---|
| 2,377,061 | Zimmerman | May 29, 1945 |
| 2,843,346 | Cunningham | July 15, 1958 |

FOREIGN PATENTS

| | | |
|---|---|---|
| 304 | Great Britain | Feb. 17, 1858 |
| 709,039 | Germany | Aug. 4, 1941 |